Figure 1:
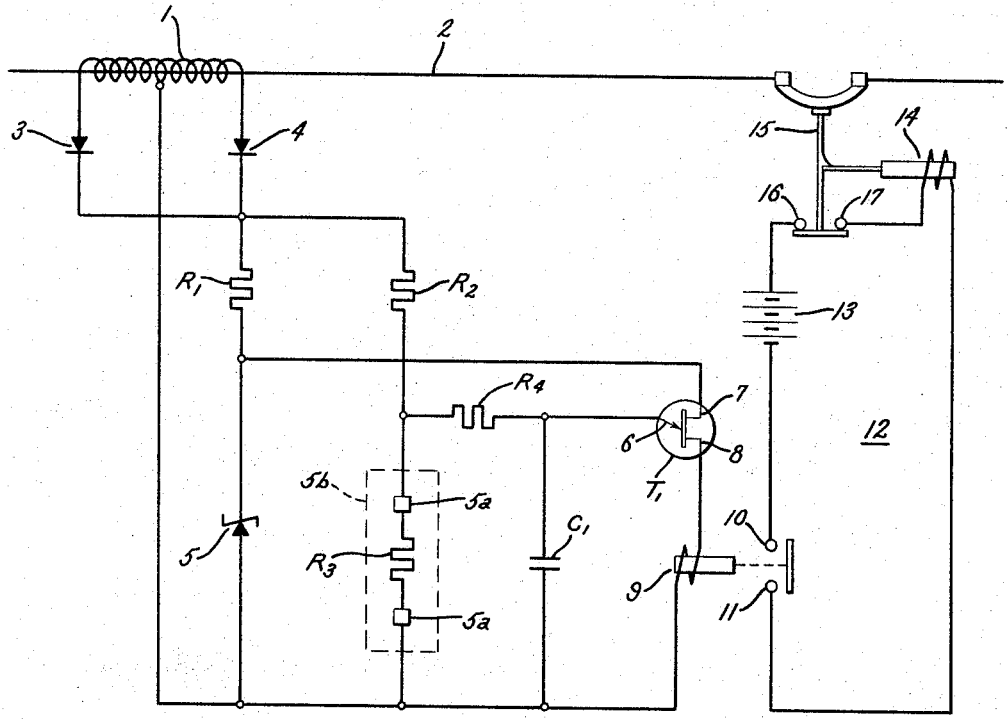

July 25, 1967

F. L. STEEN 3,333,155

INVERSE OVERCURRENT-TIME DELAY CIRCUIT PROTECTIVE
DEVICE UTILIZING NONLINEAR RESISTANCE

Filed Dec. 30, 1963

INVENTOR:
FLOYD L. STEEN,
BY Albert S. Richardson Jr.
ATTORNEY.

United States Patent Office 3,333,155
Patented July 25, 1967

---

3,333,155
INVERSE OVERCURRENT-TIME DELAY CIRCUIT PROTECTIVE DEVICE UTILIZING NONLINEAR RESISTANCE
Floyd L. Steen, Lansdowne, Pa., assignor to General Electric Company, a corporation of New York
Filed Dec. 30, 1963, Ser. No. 334,467
7 Claims. (Cl. 317—36)

The present invention relates to a protective device for an electric current circuit and, more specifically, to a static overcurrent trip device.

It is well known that electric circuits and apparatus can safely endure overcurrent conditions without damage for only a limited period of time which varies inversely with approximately the square of the overcurrent magnitude. Accordingly, it is desirable that the operating time of an overcurrent protective device be inversely related to a power of the circuit current magnitude or, stated in another manner, that the product of the $n$th power of circuit current I and the operating time $t$ be equal to a constant K ($I^n t = K$). The exponent $n$ is usually 2. If such operation is achieved, the effective speed of the protective device will increase directly in accordance with the likelihood of damage to the protected circuit. Further, it is desirable that such protective devices be "static" in nature rather than utilizing mechanical or electromechanical components.

It is accordingly an object of the present invention to provide a simple static overcurrent protective device having approximately an $I^2 t$-equals-a-constant operating characteristic.

This object and others are achieved in one embodiment of the invention by the provision of a semiconductor switching element that operates in response to the occurrence of an overcurrent condition in a protected circuit. The current through the circuit is sensed and utilized to develop a DC control voltage across a voltage divider, the control voltage being representative of the circuit current. The voltage divider includes a nonlinear impedance the ohmic value of which varies as a function of the magnitude of current passing therethrough in order to develop at an intermediate point of the divider a modified voltage that is a progressively larger portion of said control voltage as the magnitude of the control voltage increases. An R-C timing circuit is connected to the intermediate point of the voltage divider. The voltage across a capacitor in the timing circuit, on attaining a predetermined critical level, activates the semiconductor switching element. Since the modified DC control voltage applied to the timing circuit increases proportionately more than the magnitude of overcurrent increases, the capacitor will be more quickly charged to the critical level necessary to activate the semiconductor switching element at high overcurrent magnitudes than at relatively low magnitudes, and the desired $I^n t$-equals-a-constant relationship is approached. Operation of the switching element may be utilized to initiate tripping of a circuit interrupter, thereby opening the protected circuit.

Figure 2:
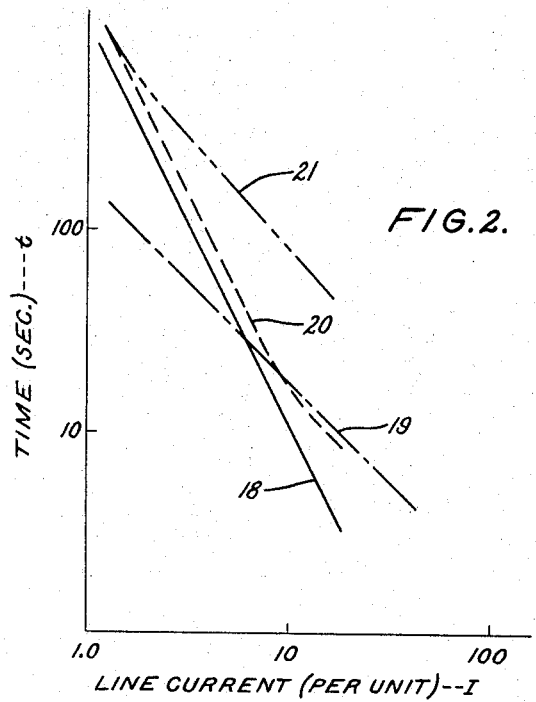

The novel and distinctive features of the invention are set forth in the appended claims. The invention itself, together with further objects and advantages thereof may be best understood by reference to the following description and the accompanying drawing in which:

FIG. 1 depicts in schematic form the preferred embodiment of my improved static overcurrent protective device; and FIG. 2 depicts graphically the operating characteristic of the device of the present invention as contrasted to less-desired operating characteristics.

Referring to FIG. 1, there is shown in schematic form an embodiment of the improved static overcurrent protective device of the present invention wherein a special nonlinear impedance element is employed to achieve the desired operating characteristic. A center-tapped current transformer 1 is utilized to sense the current flowing through a line 2 representing the protected electric power circuit. The output of the transformer 1 is full-wave rectified by diodes 3 and 4. The rectified output of the transformer 1 is applied to first and second voltage dividers. The first voltage divider comprises resistance $R_1$ and a Zener diode 5 which establishes a reference voltage at the junction between the resistance $R_1$ and Zener diode 5. The second voltage divider comprises impedance elements $R_2$ and $R_3$, element $R_3$ being nonlinear in the illustrated embodiment of the invention. Resistive material having an ohmic value that varies as a direct function of the current passing therethrough is selected for $R_3$. Preferably this resistance is provided with heat sinks 5a and is positioned within an envelope 5b in an inert atmosphere.

An R-C timing circuit, comprising serially connected resistance $R_4$ and capacitance $C_1$, is connected to the junction between resistances $R_2$ and $R_3$. The junction between resistance $R_4$ and the capacitance $C_1$ is connected to the emitter 6 of a unijunction transistor $T_1$, the voltage across the capacitor $C_1$ serving to control the switching of the unijunction transistor. A base 7 of the unijunction transistor $T_1$ is connected to the reference voltage developed by the first voltage divider, the second base 8 of the transistor being returned through an electroresponsive element, such as the operating coil of a relay 9, to the center tap of the current transformer 1.

The relay 9 is connected in circuit with the unijunction transistor $T_1$ in such a manner that the relay is energized when the transistor is fired. Activation of the relay 9 causes shorting of the terminals 10 and 11 of a circuit breaker trip circuit 12 to thereby complete the current path for a battery 13 thereby causing current to flow in the trip circuit. A trip device 14 is provided in the circuit as shown, this device being energized when relay 9 is activated to thereby unlatch the circuit breaker 15 to open the line 2. The unlatching of the circuit breaker 15 also opens the terminals 16 and 17 to interrupt the current flow in the trip circuit.

The operation of the static overcurrent protective device of the present invention is as follows:

The current flowing in the line 2 induces a voltage in the transformer 1, the voltage thus produced being full-wave rectified by diodes 3 and 4 and impressed across the afore-mentioned voltage dividers. The DC control voltage thus defined is linearly proportional to the current flowing through the line. The intermediate point of the first voltage divider comprised of resistance $R_1$ and Zener diode 5 is clamped at a reference voltage by the Zener diode 5 in accordance with known techniques, even through the voltage across the divider varies in accordance with line current. The control voltage across the second voltage divider comprised of impedance elements $R_2$ and $R_3$ determines the current flowing through $R_3$. The ohmic value of the element $R_3$ increases as the magnitude of current passing therethrough increases, thus redefining the voltage across this element. It is seen that for a given percentage increase in voltage across the entire divider, the voltage at the junction of elements $R_2$ and $R_3$ will increase by an even greater percentage because of the increased ohms of $R_3$ relative to $R_2$. Thus, a modified DC control voltage appears at the junction between $R_2$ and $R_3$.

The modified DC control voltage is utilized to charge capacitance $C_1$ through the resistance $R_4$. When the capacitance $C_1$ is charged to a critical voltage level required to fire the unijunction transistor $T_1$, current flows in the emitter-base circuit of the transistor $T_1$ thereby energizing the controlled element 9 and causing current to flow in the breaker trip circuit 12 to energize the device 14 and open the line 2. Since the base 7 of the transistor $T_1$ is connected to the junction between resistance $R_1$ and Zener diode 5, the aforementioned reference voltage is impressed across the transistor, the reference voltage remaining constant and not varying with line current. Since the interbase voltage of the transistor is maintained relatively constant, the firing voltage is also maintained constant in accordance with known principles. Since the firing voltage of the unijunction transistor $T_1$ is maintained constant, the time required to fire the transistor following the incidence of an overcurrent condition in the line 2 will be inversely related to the amount of resulting increase of the modified control voltage applied to the R-C timing circuit comprising $R_4$ and $C_1$. As pointed out above, the modified control voltage increases with line current but at a progressively increasing rate due to the action of the nonlinear element $R_3$. It is found that through a suitable choice of parameters, the capacitor $C_1$ will charge to a level necessary to fire the unijunction transistor $T_1$ with a time delay that is inversely proportional to approximately the second power of the line current magnitude for a significant range of overcurrent magnitudes.

In one successful embodiment of the present invention a tungsten wire was utilized for the impedance element $R_3$. The tungsten wire increased its resistance by approximately 210 percent as the current through it was increased from 1 per unit to 6 per unit. This increase in resistance for the particular parameters selected produced a close approximation of the $I^2t=K$ characteristic for the range of overcurrents involved. In order to limit the temperature rise of $R_3$ to that required for this increase in resistance, the absolute value of 1 per unit current in the tungsten wire was selected to provide an initial temperature that enabled the conduction and radiation losses of $R_3$ to increase appropriately with increasing power dissipated in this wire.

In order to minimize convection heating losses and corrosive effects at its higher temperatures, the tungsten wire was located in an inert atmosphere. A thin wire was used to provide quick thermal response to the line current magnitude. Heat sinks 5a as shown in FIGURE 1 can be provided for faster thermal recovery of the device after an overcurrent condition subsides. Because of the relatively high operating temperature and the small mass of such a tungsten wire, its ambient temperature has no significant effect on the time delay characteristics.

Referring specifically to FIG. 2 there is shown on a log-log plot of current v. time a comparison of the operating characteristic of the device of the present invention as compared with a true $I^2t=K$ characteristic and less desirable operating characteristics. The true $I^2t=K$ operating characteristic is depicted as line 18 whereas a less desirable characteristic ($It=K$) is represented by line 19. Line 20 represents the operating characteristic of my overcurrent protective device, while the line 21 indicates the operating characteristic of the device of the present invention when the nonlinear resistance $R_3$ is replaced by a linear resistance. Thus, it is clearly seen that the operating characteristic of the present invention can be made to closely approximate an $I_2t=K$ relationship through the use of the nonlinear element $R_3$, the ohmic value of which is directly dependent upon the amount of current passing therethrough and thus upon the magnitude of overcurrent sensed.

Thus, the present invention presents an overcurrent responsive device which successfully approximates an $I^2t$-equals-a-constant operating characteristic while being essentially static in nature and thus exhibiting low power requirements and long life. Because of its inherent simplicity the device may be advantageously used in those applications where precise accuracy is not required over a substantially unlimited range of overcurrent magnitudes.

Although the invention has been described with respect to certain specific embodiments, it will be appreciated that modifications and changes may be made by those skilled in the art without departing from the spirit and scope of the invention. For example, the illustrated device can be refined by adding thereto known means for obtaining controlled gating and quick reset of the device.

Therefore, what is claimed as new and desired to be secured by Letters Patent of the United States is:

1. A protective circuit for initiating operation of a circuit breaker to open a line upon the occurrence of an overcurrent condition, said circuit comprising:
 (a) a unijunction transistor for initiating opening operation of the circuit breaker in response to the occurrence of a predetermined overcurrent condition in the line, said transistor having an emitter, first base and second base electrodes;
 (b) timing means having a predetermined fixed time constant connected to the emitter of said unijunction transistor for controlling the conductive state of the transistor;
 (c) means responsive to the current in the line for developing across two parallel voltage dividers a DC control voltage proportional to said current,
  (i) one of said voltage dividers including a Zener diode to establish a reference voltage at an intermediate point of said one divider, and
  (ii) the other voltage divider including a nonlinear resistance, the ohmic value of which increases as the magnitude of current passing therethrough increases, to establish a modified DC control voltage at an intermediate point of said other divider;
 (d) means for applying said modified DC control voltage to the timing means;
 (e) means for applying said reference voltage to the first base of the unijunction transistor; and
 (f) controlled means connected to the second base of said transistor, said controlled means being adapted to actuate the circuit breaker to open the line upon firing of the transistor.

2. A protective circuit as defined in claim 1 wherein said nonlinear resistance comprises a tungsten wire.

3. A protective circuit as defined in claim 2 wherein said tungsten wire is enclosed in an evacuated container provided with heat sinks.

4. A protective circuit for opening an electric current line upon the occurrence of an overcurrent condition, said circuit comprising:
 (a) switching means for opening the line in response to a predetermined overcurrent condition;
 (b) means responsive to the current in said line for developing a representative signal;
 (c) means including two impedance elements in series supplied by said representative signal for developing across one of said elements a disproportionate control voltage, said one element comprising a nonlinear impedance whose ohmic value varies in a predetermined direct relationship with the magnitude of the representative signal;
 (d) timing means comprising a resistor and a capacitor serially connected across said one element for unidirectional energization by said control voltage; and
 (e) means connected to said capacitor and responsive to the capacitor voltage attaining a predetermined critical magnitude for activating said switching means and thereby opening the line, said predetermined relationship being selected so that over a predetermined range of overcurrent magnitudes the time required for the capacitor voltage to attain said critical magnitude following the incidence of the overcurrent condition is inversely proportional to approximately the square of the line current magnitude.

5. A protective circuit as defined in claim 1 wherein said timing means comprises a capacitor connected to said emitter and a resistor connected between said emitter and the intermediate point of said other divider, said one divider includes a resistor in series with said Zener diode, and said other divider includes a resistor in series with said nonlinear resistance.

6. A protective circuit as defined in claim 5 wherein said nonlinear resistance comprises a tungsten wire.

7. A protective circuit as defined in claim 6 wherein said tungsten wire is enclosed in an evacuated container provided with heat sinks.

References Cited

UNITED STATES PATENTS

| | | | |
|---|---|---|---|
| 1,872,560 | 8/1932 | Breisky | 317—41 |
| 2,875,382 | 2/1959 | Sandin et al. | 307—88.5 X |
| 2,920,242 | 1/1960 | Koss | 317—36 |
| 2,977,510 | 3/1961 | Adamson et al. | 317—148.5 X |
| 3,105,920 | 10/1963 | Dewey | 317—36 |
| 3,155,879 | 11/1964 | Casey et al. | 317—32 |
| 3,160,788 | 12/1964 | Antoszewski et al. | 317—36 |
| 3,182,227 | 5/1965 | Brittain et al. | 317—142 |

MAX L. LEVY, *Primary Examiner.*

R. V. LUPO, *Assistant Examiner.*